United States Patent
Comisky

(10) Patent No.: US 7,050,552 B2
(45) Date of Patent: May 23, 2006

(54) SYSTEM AND METHOD TO MITIGATE POTS RINGING INTERFERENCE IN DSL

(75) Inventor: David A. Comisky, St. Charles, IL (US)

(73) Assignee: Texas Instruments Incorporated, Dallas, TX (US)

( * ) Notice: Subject to any disclaimer, the term of this patent is extended or adjusted under 35 U.S.C. 154(b) by 712 days.

(21) Appl. No.: 10/034,510

(22) Filed: Dec. 28, 2001

(65) Prior Publication Data

US 2003/0123645 A1 Jul. 3, 2003

(51) Int. Cl.
*H04M 11/00* (2006.01)
(52) U.S. Cl. .............................. 379/93.01; 379/93.05; 379/93.06; 379/93.09
(58) Field of Classification Search ............. 379/93.01, 379/93.05, 93.06, 93.09
See application file for complete search history.

(56) References Cited

U.S. PATENT DOCUMENTS 6,542,465 B1 * 4/2003 Wang ...................... 379/93.01
2001/0010716 A1 * 8/2001 Smith et al. ........... 379/106.05

* cited by examiner

*Primary Examiner*—Jefferey F. Harold
(74) *Attorney, Agent, or Firm*—Abdul Zindani; W. James Brady, III; Frederick J. Telecky, Jr.

(57) ABSTRACT

A system and method are disclosed to mitigate the interference on DSL due to high frequency components associated with a change in a POTS condition, such as POTS ringing. In response to detecting that a potentially disruptive POTS condition is to about to occur, downstream DSL traffic can be temporarily stopped. The stoppage can include downstream traffic of voice and/or data.

23 Claims, 5 Drawing Sheets

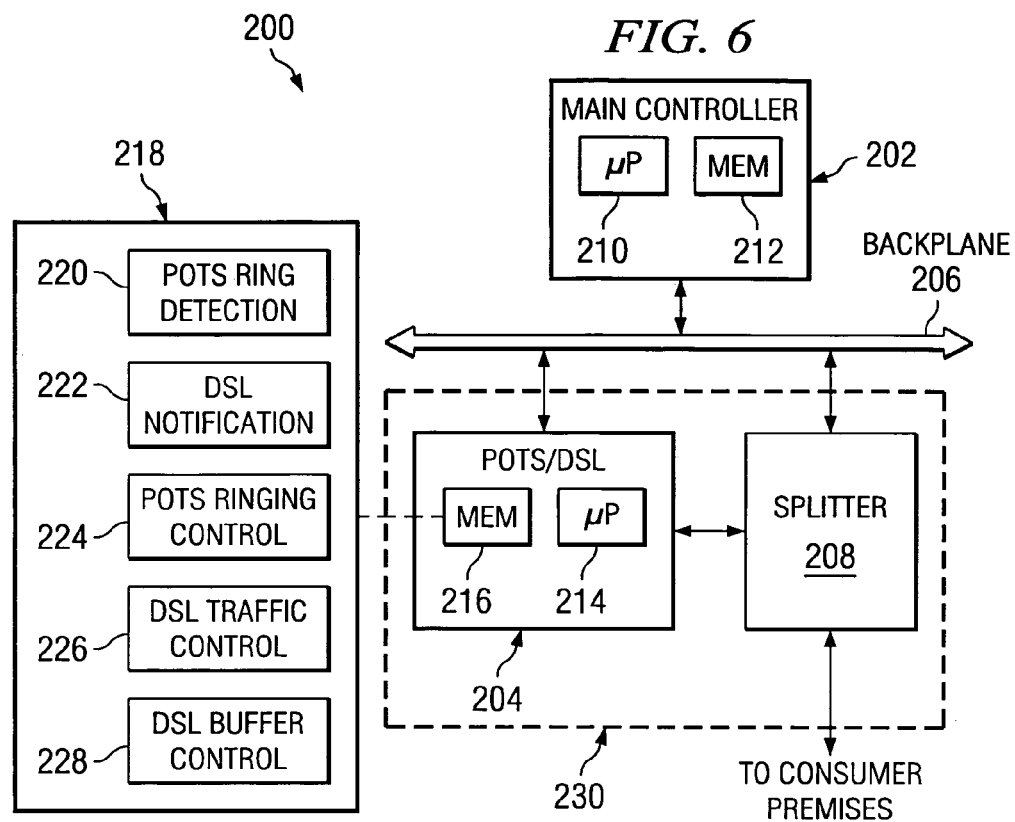
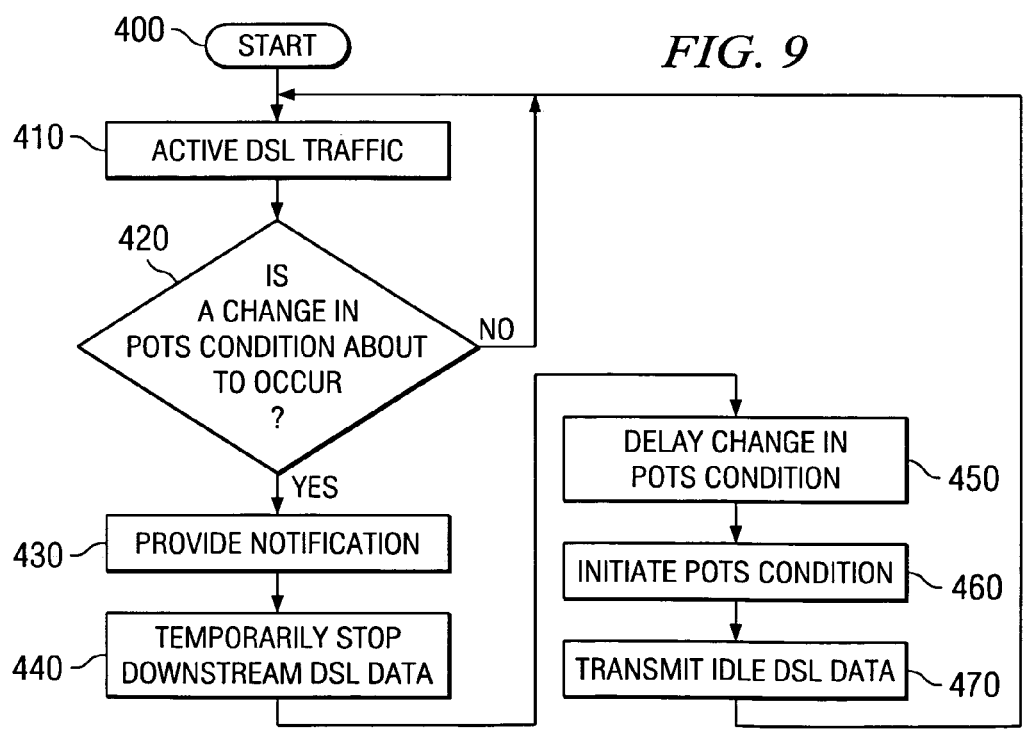

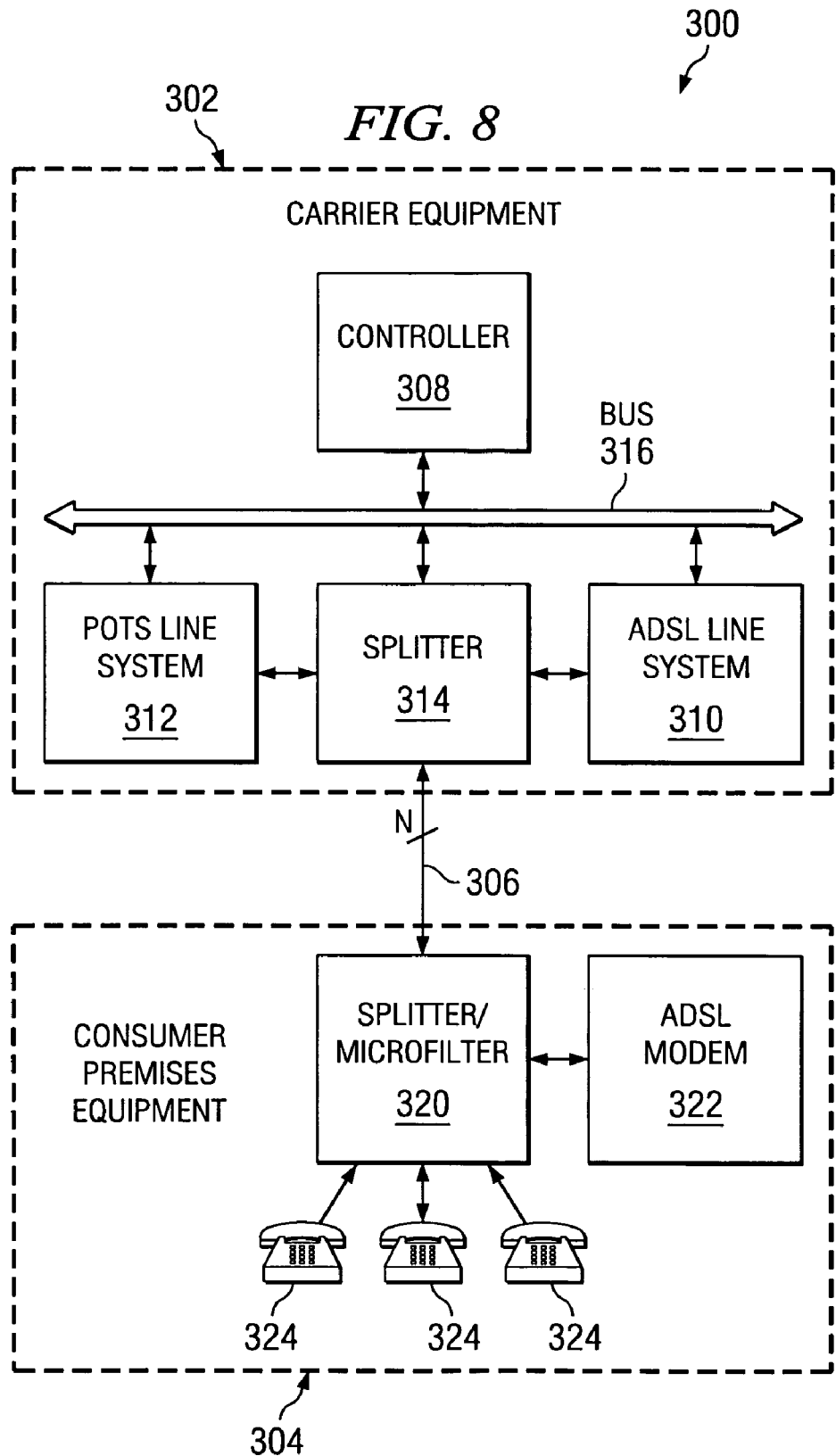

SYSTEM AND METHOD TO MITIGATE POTS RINGING INTERFERENCE IN DSL

TECHNICAL FIELD

The present invention relates generally to communications and, more particularly, to a system and method to mitigate POTS ringing interference in Digital Subscriber Line.

BACKGROUND OF THE INVENTION

As the world moves further into the digital era, the need for integrating data passing capabilities has become almost as important than voice itself. In response to this, Asymmetric Digital Subscriber Line (ADSL) platforms were created, which employ the existing infrastructure of the Plain Old Telephone System (POTS) as paths for multimedia and high speed data communications. While the conventional telephone voice circuit in the POTS system typical utilizes only about 4 KHz bandwidth, the physical wire connection bandwidth is far greater than this.

While the addition of ADSL technology to the POTS system is a monumental achievement, it is not without issue. The POTS system was originally created to transport analog voice (only), and, to many people's point of view, fell victim to the unfortunate feature of being incredibly reliable. This created an ever-increasing compatibility problem, as newer and newer systems had to be backward compatible with older and older consumer premise equipment (CPE). ADSL brings about new challenges to this environment, as it operates in frequency ranges which the POTS system, while supportive of, was never originally designed to accommodate.

To fully understand this, a very basic understanding of ADSL is needed. ADSL technology works on the principle of Discrete Multiple Tones (DMT), where a tone is simply a frequency. That is, data is transported over ADSL by modulating signals on numerous, but discrete frequencies. In the case of ADSL, the frequencies are spaced evenly at 4.3125 KHz intervals, typically ranging from DC to 1.104 MHz (e.g., with 256 discrete frequencies). As stated above, ADSL runs over the POTS system, which can introduce many problems, one of which is interference between the conventional POTS system and ADSL. Because, the POTS system originally was defined to "own" the 0–8 KHz band, to maintain compatibility with the POTS system, ADSL standards have restricted the ADSL spectrum to start at a range above 8 kHz. Typically, most vendors have opted to start ADSL processing at around 30 kHz (e.g., Tone 7 or 8), which is above the human audible range and outside the POTS spectrum. This may vary slightly from one ADSL vendor or implementation to the next; however, the issue of POTS interference must be dealt with regardless of where the ADSL frequency range begins.

While providing separation of spectrums for POTS and ADSL, their co-existence is still complicated by one underlying issue: when POTS was originally defined, it only considered the existence of telephones. Consequently, specifications and standards for compatible equipment were very strict from 0–8 KHz, but almost non-existent beyond that range. Thus, POTS equipment can, and frequently does, produce detrimental interference to ADSL systems running on them. The result of such interference is normally reduced performance, which can include lower connection rates, data error conditions, and, in some circumstances, even data loss or modem disconnection. All of these are challenges the ADSL system designer faces.

To address these issues, ADSL designers and developers went back to the fundamentals. Obviously, the inclusion of appropriately placed high-pass and low-pass filters of significant performance is a very good way to ensure to proper operation of each system operating together. In the ADSL/POTS world, such filter networks are referred to as splitters. At consumer premises, splitters are 3-ported entities, wherein one port goes to the phone line, a second to the phone, and a third to the ADSL modem. A splitter thus is designed to pass high frequencies (e.g., those greater than 8 KHz) with little/no attenuation between the line and ADSL port, and to pass low frequencies (8 KHz and less) with little/no attenuation between the line and phone ports. In theory, inclusion of splitters at both the phone central office (CO) and consumer premise should allow non-interfering operation of POTS and ADSL. However, cost becomes a practical consideration and, hence compromises have been made. Due to such considerations, the quality of filters often is compromised and, while improvements are seen, some POTS interference still gets through to ADSL. A primary source of POTS interference is POTS ringing.

POTS ringing can be exceptionally detrimental to ADSL because it involves such large voltages. In the United States for example, ringing can introduce a 100V peak-to-peak sine wave onto the telephone line. With even a light load on the line, this can result in some leakage current into devices connected to the line, and thus interference tends to occur. Splitters, being a load on the line, have made improvements to reducing interference, but improvements in reducing such interference are still desired.

In an effort to reduce noise and interference associated with DSL, DSL developers and designer have focused efforts on reducing DSL susceptibility to POTS interference algorithmically, in addition to efforts in improved splitter design. For example, Reed Solomon correction, and interleaving as methods have been developed to improve burst error protection. Reed Solomon provides additional parity bytes to an encoded data stream, such that errors detected at the receiver can be corrected, and the stream reconstructed without retransmission. Such corrective behavior is often referred to as Forward Error Correction (FEC). FEC has limitations, as only a maximum number of errors per data symbol can be corrected.

To aid in this, interleaving is an additional benefit when used with FEC algorithms. Interleaving involves temporally spacing consecutive data samples across larger (than sampling) periods of time, such that impulse noise, which affects several samples, does not corrupt adjacent samples of a particular datum (called a DMT symbol). In this manner, errors caused by impulse noise are 'spread out' over multiple symbols, thus increasing the likelihood that FEC algorithms will be able to correct errors in each symbol independently. Interleaving can be highly effective in increasing burst immunity, however, comes at a cost, namely, memory. As a consequence, most ADSL implementations have a fairly small amount of interleaving capability. It is additionally noteworthy that the ADSL standard (T1.413) actually provides two modes of operation-interleave (at various depths/latencies) and a 'fastpath', which specifies no interleaving. In the fastpath mode, there is no interleaving protection, and thus it is highly susceptible to the aforementioned POTS interference.

Conventional approaches, including FEC and interleaving algorithms, are highly innovative, yet still are subject to bit error conditions caused in ADSL by POTS interference. As mentioned above, POTS ringing can cause severe interference to ADSL systems, due to both high voltages as well as to the duration of impulses.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a system to mitigate interference between high frequency communications (e.g., DSL) and low frequency communications (e.g., POTS) over a common line. A detector is operative to detect approximately when a potential disruptive POTS condition is about to occur, such as change in a ringing condition associated with the line. A high frequency communications system associated with the line is operative to temporarily stop downstream transmission of high frequency data in response to detecting (e.g., by the detector) that the change in the POTS condition is about to occur. For example, the temporary stop in downstream transmission can be implemented by causing the high frequency communications system to not accept downstream DSL data from an associated bus. As a result, interference on the downstream transmission of high frequency data due to the change in the POTS condition is mitigated.

Another aspect of the present invention provides a method for mitigating interference in downstream transmission of high frequency communications signal associated with a change in a ringing condition for low frequency communications signal, in which the high frequency communications signal and low frequency communications signal are transmitted concurrently over a common connection, such as a telephone line. The method includes detecting that a change in the ringing condition is about to occur and temporarily stopping downstream traffic of high frequency data for a time period sufficient to allow at least some of the detected change in the ringing condition to occur.

The following description and the annexed drawings set forth in certain illustrative aspects of the invention. These aspects are indicative, however, of a few ways in which the principles of the invention can be employed. Other advantages and novel features of the invention will become apparent from the following detailed description of the invention when considered in conjunction with the drawings.

BRIEF DESCRIPTION OF THE DRAWINGS

FIG. 6 is a block diagram of a system operative to mitigate POTS ringing in accordance with yet another aspect of the present invention.

FIG. 8 is an example of a communication system in accordance with an aspect of the present invention.

FIG. 9 is a flow diagram illustrating a methodology for mitigating interference due to POTS ringing in accordance with an aspect of the present invention.

DETAILED DESCRIPTION OF THE INVENTION

The present invention relates to a system and method to mitigate the interference on DSL due to high frequency components associated with a change in a POTS condition, such as POTS ringing. In response to detecting that a potentially disruptive POTS condition is to about to occur, downstream DSL traffic is temporarily stopped. The stoppage can include downstream high frequency traffic of voice and/or data, although previously buffered downstream data and idle cells can be sent during the temporary stoppage. The interruption occurs for a time period (e.g., fixed or variable) sufficient to allow the change in the POTS condition to occur. Even if data is not sent during the interruption, the potential data loss for a system operating according to the present invention is less than that normally associated with conventional termination and reconstruction of data packets.

Figure 1:
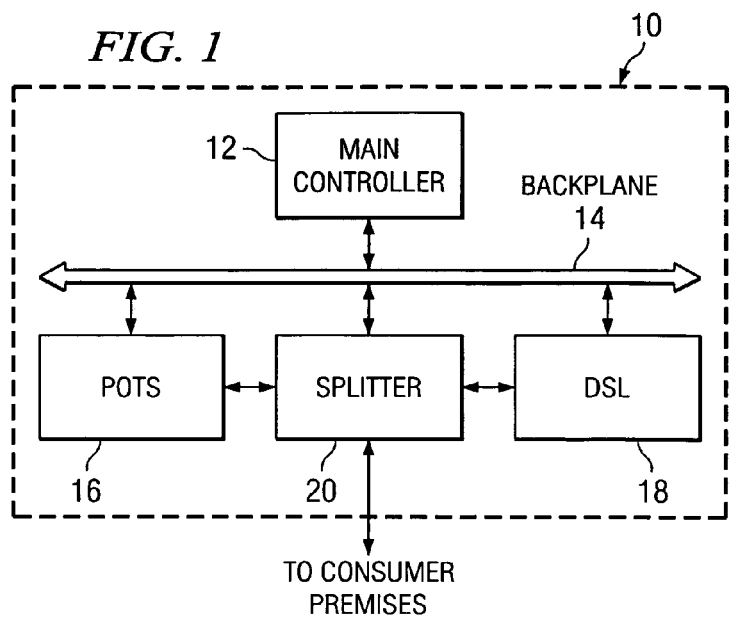
FIG. 1 is a block diagram of a system operative to mitigate POTS ringing in accordance with an aspect of the present invention.

FIG. 1 illustrates a system 10 operative to mitigate interference associated with ringing of Plain Old Telephone System (POTS). The system 10, which can be implemented at a Central Office (CO) or Digital Line Carrier (DLC), includes a main controller 12 coupled to an electronic backplane (or bus) 14. The backplane 14 provides a medium through which the main controller 12 can communicate with one or more associated system components of to enable desired voice and/or data communications with one or more consumer premises via the system 10. The main controller 12 is programmed and/or configured to control routing of calls through the associated network, such as a public switch telephone network.

In the example of FIG. 1, the system 10 include a POTS component 16, a DSL component 18, and a splitter component 20, each of which is coupled to the backplane 14. The POTS component 16 is programmed and/or configured to control communication of voice and/or data over one or more lines of an associated telephone network through the splitter 20. For example, the POTS component can be a card or other circuitry operative to route communications signals relative to its associated lines at low frequencies, such as below 8 KHz. In practice, such POTS frequencies typically are 4 KHz or less. Prior to the addition of DSL over the POTS infrastructure, the frequency range greater than about 8 KHz was generally undefined.

Figure 2:
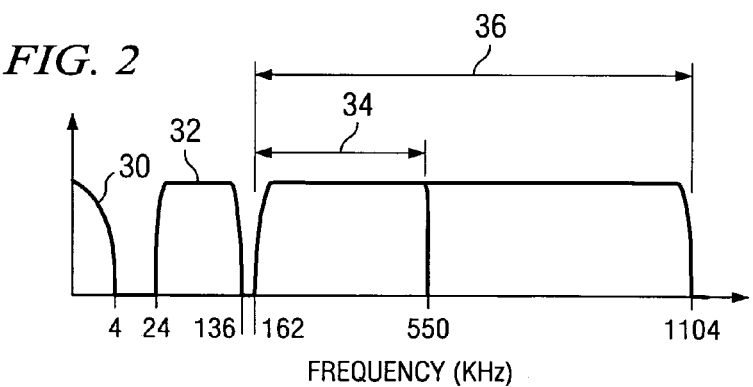
FIG. 2 is graph illustrating frequency allocation for communication between a carrier and a consumer.

FIG. 2 illustrates a frequency chart for typical types of communication signals employed in a POTS architecture. As shown in FIG. 2, a frequency range from about 0 to about 4 KHz, indicated at 30, is dedicated to conventional POTS. Also shown, is a frequency range 32 for an upstream DSL channel, which covers a range from about 24 KHz to about 136 KHz (e.g., up to about 800 Kbps plus overhead). Also depicted are two types of downstream channels, indicated at 34 and 36. The first downstream channel 34, known as G Lite, generally ranges from about 162 to about 550 KHz (e.g., up to about 1536 Kbps plus overhead). The other downstream channel 36, which provides a Full Rate, generally ranges from about 162 to about 1104 KHz (e.g., up to about 8160 Kbps plus overhead).

Referring back to FIG. 1, the DSL component 18 is programmed and/or configured to implement communication over one or more associated lines over which the POTS component also communicates at generally higher frequencies greater than 8 KHz, such as greater than about 24 KHz. The DSL component 18, for example, sends and receives data via the backplane 14. The DSL component 18 also can include memory, such as a buffer, in which it can buffer data (known as cells) for downstream transmission. The DSL component 18 also is programmed and/or configured to send data, such as from its associated buffer or from the backplane 14, to one or more associated lines via the splitter 20. The DSL data typically is transmitted as cells. The communication over the lines is bidirectional and, thus, can also include upstream high frequency data from one or more of its associated lines, which is passed from the splitter 20. Examples of frequency ranges supported by the DSL component 18 are shown in FIG. 2 at 32, 34 and 36. It is to be understood and appreciated that the particular frequency ranges can vary according to how service is implemented.

The splitter 20, which communicates low frequency signals with the POTS component 16 and higher frequency signals with the DSL component 18, is programmed and/or configured to aggregate high and low frequency signals traveling in the downstream direction (e.g., to consumer premises) and separate similar signal traveling upstream (e.g., from consumer premises). The splitter 20 can be configured to accommodate one or more telephone lines. For example, the splitter includes low-pass filter network for isolating the ordinary POTS signals that are typically below about 4 KHz and a high-pass filter network for isolating the high frequency signals associated with DSL service.

While the splitter 20 can help reduce interference between the POTS signals and DSL signals for a given line, interference between POTS and DSL downstream traffic still can be significant during POTS ringing. In particular, transient high voltages exist at periods when POTS ringing begins as well as at the end of such ringing. Frequency components that are much greater than 4 KHz also typically accompany POTS ringing along with the high transient voltages.

Figure 3:
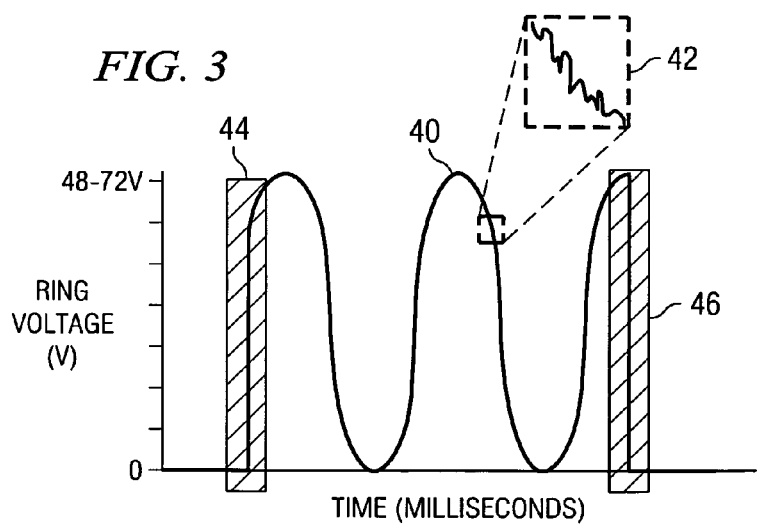
FIG. 3 is a graph illustrating an example of POTS ringing.

FIG. 3 depicts an example of a typical POTS ringing, illustrating the amplitude of the POTS ring signal 40 (in Volts) over time (in milliseconds). The ring voltage 40 typically ranges from about 48 V peak-to-peak to about 72 V peak-to-peak (and in some cases over 100 V peak-to-peak). The typical frequency of the ringing signal 40 is about 20 Hz in the U.S. or about 24 Hz in Europe. FIG. 3 also depicts an example of a high frequency DSL signal 42 carried on top of the POTS signal 40. Periods at the beginning and end of the POTS ringing, indicated respectively as shaded areas 44 and 46, correspond to periods of high voltage transients that can cause DSL errors due to high frequency components associated with such transients.

Because DSL uses much higher frequencies than POTS, the latencies associated with data communicated via DSL are significantly shorter than those associated with communication at POTS frequencies. For example, the ADSL transfer of an ATM packet typically takes no more than 32 milliseconds from end-to-end (and usually less, depending on its associated interleave depth). In contrast, POTS systems are allotted segments as long as two and three seconds just to make a phone ring. As a result of the marked differences in latencies associated with the POTS and DSL parts of the system 10, there is ample time for the system to: (1) detect when a POTS ringing condition is about to begin and/or end; and (2) react to the detected condition to mitigate errors in accordance with an aspect of the present invention.

Thus, Referring back to FIG. 1, the system 10 is programmed and/or configured to detect when a POTS ringing condition is about to begin and/or terminate (e.g., a change in the ringing condition) and, in response to detecting such a condition, temporarily interrupt or stop downstream traffic of DSL data. While downstream DSL data is stopped, idle cells can still be transmitted to maintain the DSL connection over the line. Some ways in which such functionality can be implemented are described herein, although those skilled in the art will understand appreciate other implementations, all of which are intended to be within the scope of the present invention.

By way of illustration, the DSL component 18 can operate in two basic modes (e.g., ADSL standard T1.413), namely, a fastpath mode and an interleave mode. In the fastpath mode, all data cells are sent over the DSL quickly (hence the name 'fast' path). Accordingly, in the fastpath mode, it generally will be sufficient to delay POTS ringing for a fixed, short amount of time after notifying the DSL component of the beginning or end of a ringing condition. For example, empirically, it can be shown that 6 ms should be sufficient delay for beginning or ending the ringing condition after the notification.

By way of further illustration, in the interleave mode, the DSL component 18 runs an Asynchronous Transfer Mode (ATM) protocol over a dedicated link to communicate ATM cells. If the DSL component is operating in the interleave mode and data cell acceptance is stopped in response to notification of an imminent change in the POTS ringing condition, one of two things is true: (1) Either the last ATM cell accepted by the DSL component 18 from the backplane 14 completed an interleave frame and could be sent by the DSL equipment, or (2) the last ATM cell accepted by the DSL component 18 from the backplane 14 did not complete an interleave frame and thus could be sent. In the latter case (2), there is no issue since no data transmission can occur until more data is provided. In the former case (1), however, the DSL component 18 may require time to complete the interleave frame, which can take up to the interleave delay (plus a little overhead to process the cells). Accordingly, if the DSL component 18 is to complete an interleave frame when a ringing condition is about to occur, up to about 32 ms may be required. In order to provide the required time under such circumstances, the system 10, for example, can be programmed and/or configured to detect these different conditions and implement a variable delay for the POTS ringing. Alternatively, given that the largest delay generally does not exceed about 32 ms, which is much shorter than the POTS system delays, a simple solution is to delay the initiation/termination of a POTS ringing condition until about 32 ms after notifying the DSL component 18 of the change in the ringing condition.

It is to be appreciated that the notification of the change in the POTS ringing could be provided by the controller 12 or by the POTS component 16 that is to change the ringing condition over the line. For example, the controller 12 can, upon receiving an incoming call directed to one of the consumer premises, provide a notification to the DSL component. Alternatively, or additionally, the POTS system 16 itself can provide the notification in response to receiving instructions (e.g., from the controller 12) to initiate ringing at associated consumer premises. It is to be appreciated that a notification between the POTS component 16 and the DSL component 18 is facilitated if the POTS and DSL components are integrated together, such as in a single card or other associated circuitry, according to an aspect of the present invention. For example, such integration enables the functionality to be implemented by a single processor programmed to control both the POTS and the DSL functions.

Figure 4:
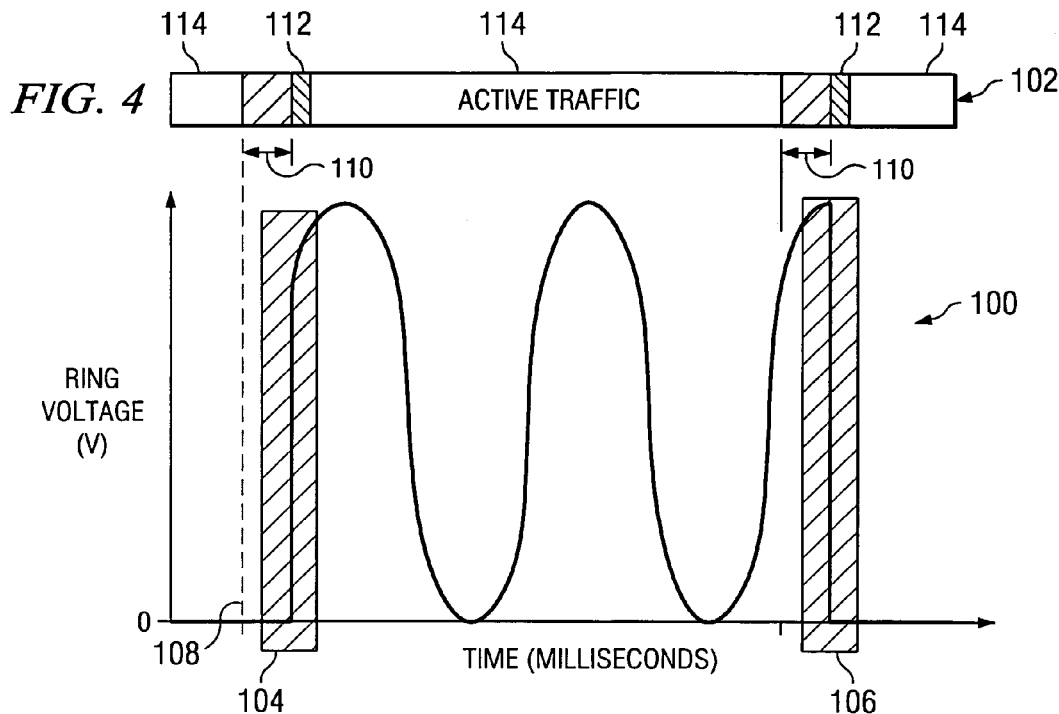
FIG. 4 is a graph illustrating an example of POTS ringing in conjunction with downstream communication traffic in accordance with an aspect of the present invention.

To better appreciate an example of timing that can be implemented relative to POTS ringing and temporary stoppage of DSL traffic, reference is made to FIG. 4. FIG. 4 illustrates a time-based graph 100 of POTS ringing and an associated time-based representation 102 of downstream DSL traffic, represented above the graph 100, in accordance with an aspect of the present invention. Shaded areas 104 and 106 represent times in which a change in a POTS ringing condition might occur, such as a beginning or end of POTS ringing, respectively. Thus, at a time prior to initiating POTS ringing, indicated at 108, central office or loop carrier equipment can stop downstream DSL traffic, such as in response to a notification of a change in an associated POTS ringing condition (e.g., from a controller in an associated equipment rack or other POTS circuitry). The stoppage is temporary so as to mitigate possible bit errors that might occur due to transients associated with a change in a POTS ringing condition. The temporary stoppage of downstream transmission of DSL data can be implemented by not accepting new data for transmission.

In accordance with an aspect of the present invention, the change in the POTS ringing condition (e.g., a start or stop) is delayed for a time period at least substantially equal to the maximum latency associated with downstream transmission of DSL traffic, indicated at 110. As mentioned above, the maximum latency 110 generally does not exceed about 32 ms for all operating modes. Thus the POTS ringing delay can be set to a fixed time period (e.g., 32 milliseconds) or be variable so as to adapt according to the maximum downstream DSL latency. During the period in which POTS ringing is being delayed 110, downstream data, such as that already buffered at the DSL component can be sent. Additionally or alternatively, idle DSL cells of data, indicated at 112, also can be set downstream during a portion of the temporary stoppage. After the change in the POTS ringing condition, active downstream data can be sent over DSL, indicated at 114.

Figure 5:
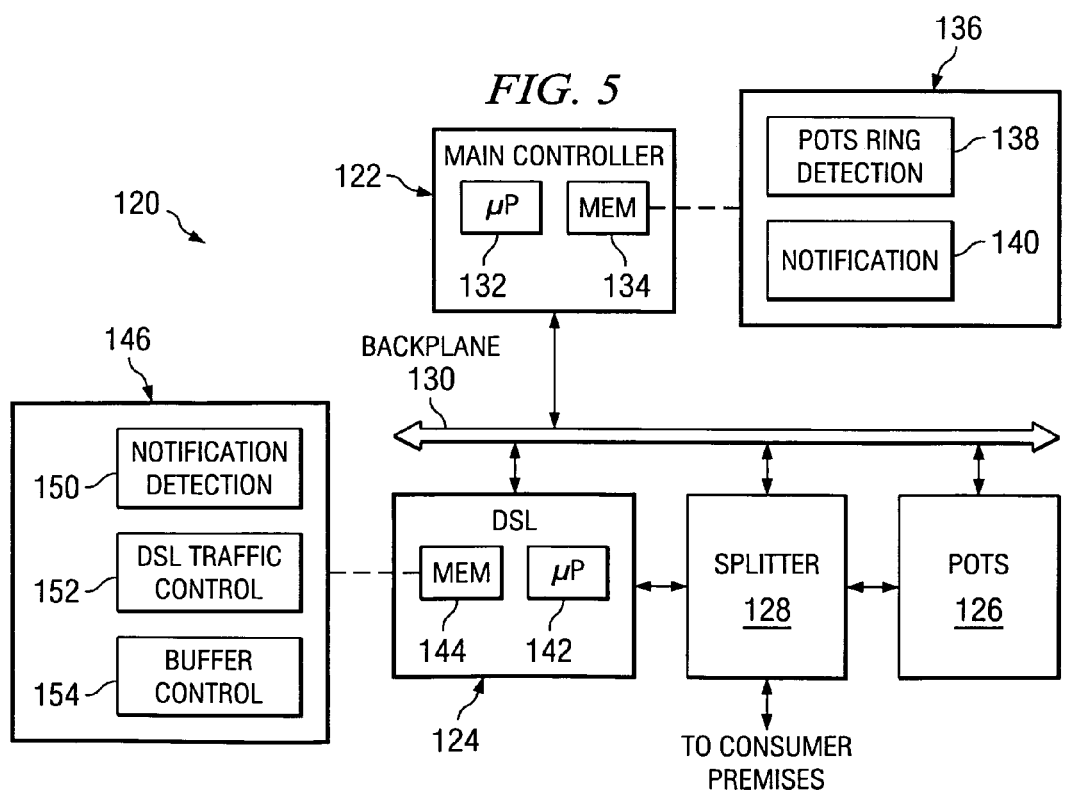
FIG. 5 is a block diagram of a system operative to mitigate POTS ringing in accordance with another aspect of the present invention.

FIG. 5 illustrates an example of a system 120 operative to mitigate interference due to POTS ringing in accordance with an aspect of the present invention. In this example, system functionality to temporarily halt downstream DSL data traffic is generally implemented in a main controller 122 and an associated DSL system 124, which are located in close proximity to each other (e.g., the same rack). The system 120 also includes a POTS system 126 and a splitter 128. In the example of FIG. 5, the system 120 includes a backplane 130 through which communication can occur between system components 122, 124, 126 and 128. In general, the controller 122 provides instructions to the respective other components to enable appropriate calls to be routed through the respective DSL and POTS systems 124 and 126 that communicate over one or more associated lines via the splitter 128, as is known in the art.

In accordance with an aspect of the present invention, the controller 122, which can be implemented as a board or card, includes a processor 132 and associated memory 134. The processor 132 is operatively associated with memory 134, which stores program code 136 executed by the processor 132 for carrying out operating functions of the system 120. The processor 132 can be any of a plurality of processors, including commercially available and/or proprietary processors. The manner in which the processor 132 can be programmed to carry out the functions relating to the present invention will be readily apparent to those having ordinary skill in the art based on the description provided herein.

In addition to traditional controller functionality, the program code 136 includes a POTS ring detection component 138. The POTS ring detection component 138 enables the controller to detect when a change in POTS ringing condition is about to occur, such as associated with the beginning or end of a ring. For example, the POTS ring detection component 138 can detect the beginning of a ring in response to receiving an incoming call directed to a telephone number of consumer premises to which the system 10 is coupled. Additionally, the POTS ring detection component 138 can detect the end of a ring, such as in response to connecting a call at consumer premises equipment and/or the caller hanging up to end the call prior to connecting.

The program code 136 also includes a notification component 140 operative to notify the DSL system of the detected POTS ringing for a given telephone line. For example, the controller processor 132 can send an appropriate notification to the DSL system 124 via the backplane 130. Those skilled in the art will understand and appreciate various notification mechanisms that could be implemented in accordance with an aspect of the present invention. For example, a dedicated signal (or message) can be sent to the DSL system 124 to cause the DSL system to temporarily discontinue downstream data traffic, as described herein.

The DSL system 124, which can be implemented as a card in a CO or DLC rack, also includes a processor 142 and memory 144. The memory 144 stores program code, indicated at 146, operative to control downstream DSL traffic based on the notification provided by the controller 122 in accordance with an aspect of the present invention.

For example, the program code 146 includes a notification detection component 150 operative to receive a POTS ringing notification, such as from the controller 122. The notification component 150 can set a flag condition to cause a DSL traffic control component 152 to temporarily halt downstream DSL traffic. The DSL traffic control component 152 can temporarily stop downstream traffic of new DSL data for a fixed duration. Alternatively, or additionally, the duration of the temporary stoppage can be variable, such as a function of the DSL mode (e.g., fastpath mode, interleave mode, etc.). The duration of the temporary stoppage can be controlled by the controller 122 and/or the DSL system 124. In any event the duration should be sufficient to allow the change in the POTS ringing condition to occur.

In order to implement the stoppage of downstream DSL data, the DSL traffic control 152, for example, can simply discontinue accepting new downstream data cells during the temporary stoppage. Alternatively, it may be desirable to accept downstream cells, but refrain from sending them to the consumer premises for the temporary stoppage. In such circumstances, a buffer control 154 can be employed to manage and store incoming cells to be transmitted after normal active downstream traffic resumes. The memory 146 thus can include suitable memory (volatile or nonvolatile) for buffering downstream traffic during a temporary stoppage. The DSL traffic control 152 also can send idle cells downstream during the temporary stoppage of downstream data to help maintain the dedicated link over its connection with the consumer premises (e.g., usually employing ATM protocol).

In addition to temporarily stopping downstream DSL data traffic, the system 120 also can delay initiating the change in the POTS ringing condition in accordance with an aspect of the present invention. The delay can be coordinated according to the maximum latency associated with downstream transmission of DSL data (e.g., usually less than 32 ms). By way of illustration, the controller 122 (or the POTS system 126) provides a notification that a change in a POTS ringing condition is about to occur at least M milliseconds before the event, where M is the maximum ADSL system delay. The DSL traffic control 152 refuses to accept downstream cells from the backplane 130 until M+N ms after the event notification, where N is the duration of the start/stop of ringing (typically 300–400 μs).

It is to be understood and appreciated that the detection of the POTS ringing condition, the notification thereof and/or the delaying of the POTS ringing can be implemented at the main controller 122 and/or at the POTS system 126 in accordance with an aspect of the present invention. The POTS system 126, for example, could include program code to send the notification of the POTS ringing condition to the DSL system 124, such as in response to being instructed to initiate ringing (e.g., by the controller 122). The POTS system 126 further could include executable instructions to impose a suitable delay prior to initiating a corresponding change in the ringing condition.

FIG. 6 illustrates another example of a system 200 programmed and/or configured to mitigate interference usually associated with a change in a POTS ringing condition in accordance with an aspect of the present invention. The system 200, which can be implemented in a rack at a CO or DLC, includes a main controller 202 coupled to an integrated POTS/DSL system 204 via a bus or backplane 206. A splitter 208 also can be coupled to the backplane 206 and to the POTS/DSL system 204 directly. The direct connection between the splitter 208 and the POTS/DSL system 204 provides a communications path to one or more consumer premises over associated lines (e.g., twisted pairs).

The main controller 202, which includes a processor 210 and associated memory 212, is programmed and configured to control routing of calls through the POTS/DSL system 204. While a single POTS/DSL system 204 is illustrated in FIG. 6, it is to be understood and appreciated that there can be (and usually are) more than one such system coupled to the backplane 206. The POTS/DSL system 204 includes a processor 214 and associated memory 216, which stores executable instructions that control micro-routing of POTS communications signals and DSL communications within the system 204. For example, the main controller 202 provides routing instructions to the POTS/DSL system 204 via the backplane and the POTS/DSL system operates appropriate circuitry to process the instructions and implement corresponding communication, such as relative to a given line (or lines) to which the POTS/DSL system is coupled through the splitter 208.

The POTS/DSL system 204 also includes program code 218 stored in the memory 216 for controlling operation of POTS and DSL equipment to mitigate interference that occurs in connection with a change in a POTS ringing condition. The program code includes a POTS ring detection component 220 operative to detect that a change (e.g., the beginning or end) in a POTS ringing condition associated with a given line is about to occur. The detection component 220, for example, sets flag condition that causes the POTS/DSL system 204 to enter a ring mode. In response to entering the ring mode, a DSL notification component 222 provides a notification signal to an appropriate DSL module (e.g., hardware and/or software) that will be affected by the upcoming ringing condition. POTS ringing control 224 also is programmed to delay initiating the change in the ringing condition for a duration, which can be a fixed or variable duration. The delay should provide sufficient time for the DSL part of the POTS/DSL system 204 to transmit downstream buffered cells, such as based on the latency of the downstream DSL transmissions.

The program code 218 also includes DSL traffic control 226 operative to control downstream DSL traffic during the temporary ring mode. In order to substantially eliminate interference due to POTS ringing, the DSL traffic control 226 temporarily stops downstream DSL data traffic. For example, the DSL traffic control can stop accepting downstream cells from the backplane 206 addressed to the line on which the change in ringing condition is about to occur. During the period in which downstream DSL data is not being sent, idle cells can be transmitted downstream to help maintain the dedicated DSL communications link with the consumer premises equipment. Because the temporary stoppage of downstream DSL data occurs only in connection with the start and/or stopping of ringing, the amount of time that the DSL data cells are not accepted from the backplane is relatively small, especially when compared to errors typically associated with termination and reconstruction of packets often required in conventional systems. Alternatively, or additionally, downstream cells could be accepted and buffered by a DSL buffer control 228 in appropriate memory 216 until the temporary stoppage ends. The amount of buffering can vary for a given application.

It is to be understood and appreciated that greater efficiency can be achieved through further integration of the POTS/DSL system 204 and the splitter 208, which integration is indicated by dashed line 230. Those skilled in the art will understand and appreciate other methodologies that could be implemented in the system 200 to temporarily stop downstream traffic of DSL data for a period sufficient to allow a change in a POTS ringing condition, all of which are contemplated as being within the scope of the present invention.

Figure 7:
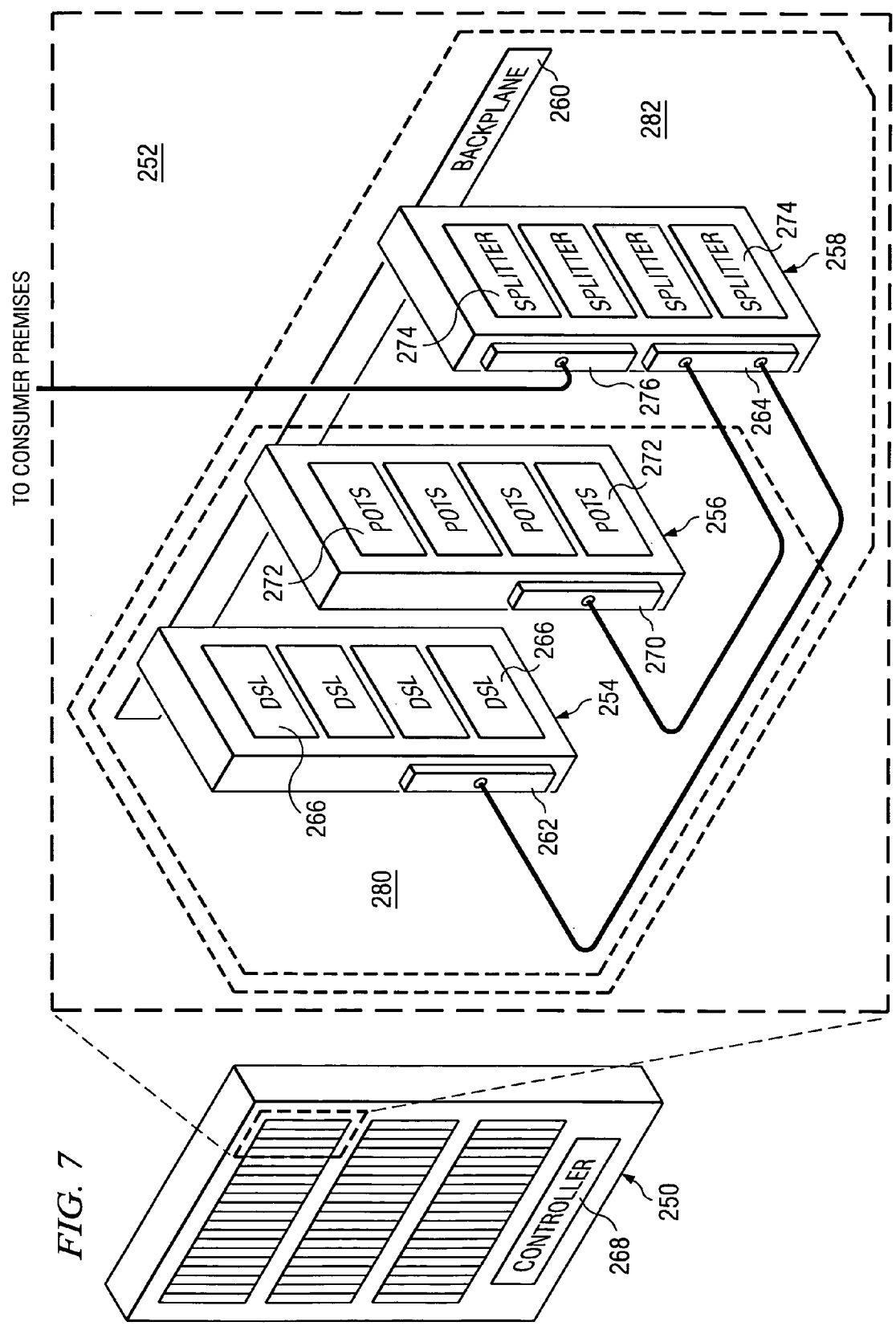
FIG. 7 is an example of a carrier equipment rack illustrating different cards of the rack in an associated exploded, isometric view.

FIG. 7 illustrates an example of a typical rack 250, such as located at a CO or a DLC, which can be programmed and/or configured to mitigate interference associated with POTS ringing in accordance with an aspect of the present invention. An enlarged section of the rack 250 is depicted at 252. The enlarged section 252 shows a plurality of cards, including a DSL card 254, a POTS card 256 and a splitter card 258, each of which are coupled to a common backplane 260 in the rack 250.

The DSL card 254 includes an interface 262 that couples the card to a corresponding interface 264 of the splitter card 258. The connection provides a path for bi-directional communication of high frequency DSL data between DSL subsystems that reside on integrated circuits 266 coupled to the card and associated consumer premises equipment. One or more of the integrated circuits 266 can be programmed and/or configured, in accordance with an aspect of the present invention, to temporarily stop transmitting downstream DSL data in response to a notification that a change in a ringing condition is about to occur over a corresponding line. The notification, for example, is provided via the backplane 260, such as from the POTS card 256 or a main controller 268 located in the rack 250. To facilitate a halt in downstream transmissions, the chip(s) 266 further can be operative to stop accepting data from the backplane 260 in the downstream direction targeted for transmission over the corresponding line as well as transmit idle DSL cells during the temporary stoppage.

The POTS card 256 also includes an interface 270 coupled to the splitter interface 264. The connection between interfaces 270 and 264 provides a path for low frequency bidirectional POTS communication between POTS subsystems that reside on integrated circuits 272 coupled to the card 256 and associated consumer premises equipment. One or more of the integrated circuits, for example, is programmed to delay the change in a POTS ringing condition according to the notification indicating that a change in the POTS ringing condition is about to occur. As mentioned above, the notification can be provided by the main controller 268 or by an associated component (e.g., one of the integrated circuits 272) of the POTS card 256, such as a subsystem for which ringing condition is to occur. The delay, for example, can be set to a duration (e.g., fixed or variable) according to a maximum probable delay associated with transmitting already buffered downstream data.

The splitter card 258 includes splitter subsystems, implemented on one or more integrated circuits 274, that aggregate downstream DSL data signals and POTS signals for downstream transmission to a given consumer premises over an associated line. The aggregated data is provided to the line via a line interface 276.

While the DSL card 254, the POTS card 256 and the splitter card 258 are shown as separate cards, it will be appreciated that further efficiencies can be achieved, in accordance with an aspect of the present invention, if functionality of more than one of the cards are integrated together. Dashed line 280 represents a first possible integration between the POTS hardware and the DSL hardware and dashed line 282 represents a second level in which the DSL, POTS and splitter are all integrated together, such as in a single card. Such integration can take advantage of sharing processors and memory, as well as facilitating cooperation between the POTS and DSL system at periods in which a change in a POTS ringing condition is about to occur.

FIG. 8 illustrates an example of a communications system 300 operative to implement POTS communications as well as DSL communications using an existing POTS infrastructure. The system 300 thus includes carrier equipment 302 operatively coupled to one or more consumer premises equipment 304 through one or more corresponding lines (e.g., twisted pairs) 306. Those skilled in the art will understand and appreciate different architectures that could be employed to provide a similar communications system, all of which can implement a system or method in accordance with an aspect of the present invention.

The carrier equipment 302 includes a controller 308 programmed and/or configured to control and coordinate operation of various subsystems and processes, including call routing, that occur at the carrier equipment (e.g., within a rack). The controller 308 is coupled to an ADSL line system 310, to a POTS line system 312 and to a splitter system 314 via a common bus (or backplane when implemented within a rack) 316 of the carrier equipment 302. The ADSL line system 310 is programmed and/or configured to implement micro-routing between one or more of its ADSL service modules and associated consumer equipment. In accordance with an aspect of the present invention, the ADSL line system 310 also controls temporarily stopping downstream communication of DSL data for a time period sufficient to allow a change in a POTS ringing condition for a given line 306 to occur.

The temporary stopping of downstream data can be initiated in response to a notification (e.g., from the controller 308 or the POTS system 312) that a change in a POTS ringing condition for a given line 306 is about to occur. The change in POTS ringing condition itself also can be delayed for a time period (e.g., fixed or variable) to allow downstream DSL data transmissions that are already in process to complete. When data cells are not available, the ADSL system 310 can transmit idle cells. A short time period after the ringing condition changes to a ringing or not ringing condition, the ADSL system 310 can resume normal active downstream DSL traffic of data cells. Advantageously, the small delays associated with the change in the ringing condition, which only occur at the start or stop of ringing, allow the temporary stoppage of downstream DSL data on a given line to be relatively short.

Thus, the ringing signal together with active downstream DSL traffic can be provided to the consumer premises equipment 304 via its associated line 306. The signal is received at a splitter/microfilter 320 operative to separate the low frequency POTS signal and the higher frequency DSL signal. The splitter 320 for example includes high and low pass filter networks configured to perform desired noise reduction as well as rout the respective signals. That is, the splitter 320 provides the high frequency DSL signal to an associated ADSL modem 322. The low frequency POTS signals are provided to one or more telephones, a modem, an answering machine or other device operative to receive the low frequency POTS signal.

In view of the foregoing structural and functional features described above, a methodology in accordance with various aspects of the present invention will be better appreciated with reference to FIG. 9. FIG. 9 illustrates a methodology for mitigating interference associated with POTS ringing in accordance with an aspect of the present invention. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. While the methodology is described with respect to a single line in which both POTS and DSL communications can occur, it is to be understood and appreciated that the methodology can be implemented with respect to a plurality of lines in accordance with an aspect of the present invention.

The methodology begins at 400 in which general initializations occur, such as upon activating a communications system that is to implement the methodology. Such initializations include, for example, allocating memory, establishing pointers, acquiring system resources, instantiating objects and setting initial values for variables. Next, at 410 active downstream communication of DSL traffic occurs. The active communication, for example, can include communication over a given line (e.g., twisted pair) between a central office and consumer premises equipment. The communication can include POTS and/or DSL, with the DSL being implemented as a dedicated data link over its connection (e.g., ATM). It is to be appreciated that at the CO or CPE side of the DSL connection, ATM can be terminated and translated into a more popular data protocol, such as Ethernet.

Next at 420, a determination is made as to whether a change in a POTS condition is about to occur, such as a change in a POTS ringing condition. For example, a change in POTS ringing condition can correspond to the start or the stop of ringing. The determination, for example, can be implemented by a main controller, such as that controls processes in a CO rack, or by a POTS system within the rack. If no change in the POTS condition has been detected to occur, the methodology returns to 410 in which active downstream communication continues. If a change in the POTS ringing condition is detected (420), the methodology proceeds to 430.

At 430, a notification of the expected change in the POTS condition is provided. The notification can be provided, for example, by the main controller or by a POTS system associated with a given line on which the detected upcoming change in the ringing condition is about to occur. Next, at 440, downstream transmission of high frequency DSL data is temporarily stopped, such as in response to the notification (430). For example, a DSL system associated with the line on which the change in the ringing condition is about to occur can control the downstream traffic of DSL data accordingly.

At 450, the change in the POTS condition (e.g., the beginning or termination of ringing) also can be delayed, so as to provide ample time for the DSL system to transmit buffered DSL cells. The delay can be for a fixed time period or vary according to an operating mode of the DSL system (e.g., fastpath mode or interleave mode). About a fixed delay of less than or equal to about 32 milliseconds should be sufficient for most circumstances, although other durations also could be used in accordance with an aspect of the present invention. After the time period of the POTS ringing delay, the appropriate ringing condition (e.g., start or stop) can be initiated at 460. At 470, idle DSL data can be transmitted downstream during the temporary stoppage, such as including after the POTS ringing delay and/or when the change in the ringing condition is being initiated. Because the idle data cells contain no actual data, the quality of services is unaffected. The idle cells help maintain the point-to-point connection associated with a DSL link over an associated telephone line between the CO and CPE.

After the temporary stoppage of downstream DSL data, active downstream DSL traffic can be resumed and the methodology returns to 410. For example, the DSL system can temporarily stop downstream DSL data traffic (other than possibly idle cells) for a predetermined time period from the notification at 430. The time period can correspond to the duration that POTS ringing is delayed (450) plus the duration of the start/stop of ringing (e.g., typically 300–400 μs).

It is to be understood and appreciated that the overall 'idle' time (when no DSL data is sent downstream) is in fact far less than that conventionally associated with normal termination and reconstruction of packets into different formats (like Ethernet). Accordingly, event existing DSL-POTS system architectures should include sufficient buffering and handling capabilities to implement such a methodology. It is to be further appreciated that additional efficiencies and economies of scale exist when the system in which such methodology is implemented becomes more highly integrated. That is, as ADSL becomes more deployed, a trend likely will be to integrate the POTS and ADSL functions onto common hardware (e.g., a single card). Such integration will facilitate implementing a methodology in accordance with the present invention. Additional benefits may be realized at that time as well, such as using advanced signaling methods and dynamic filter control.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to mitigate interference between high frequency and low frequency communications over a common line, comprising:
    a detector operative to detect approximately when a change in a ringing condition associated with the common line is about to occur and provide a notification indicative thereof; and
    a high frequency communications system associated with the common line for communication of at least one of voice and data as high frequency data via the common line, the high frequency communications system being operative to temporarily stop downstream transmission of the high frequency data based on the notification, and
    transmit idle data cells downstream during the temporary stoppage of downstream transmission of high freaquency data.

2. The system of claim 1, further comprising a bus from which the high frequency communications system receives data for high frequency downstream transmission over the common line, the high frequency communications system temporarily refusing data from the bus in response to the notification.

3. The system of claim 2, further comprising a Plain Old Telephone Service (POTS) system coupled to the bus to receive at least one of voice and data for transmission as low frequency data via the common line, the POTS system being operative to delay initiating the change in the ringing condition for a time period according to the notification.

4. The system of claim 3, the time period being a predetermined time period less than or equal to about thirty-two milliseconds.

5. The system of claim 3, the high frequency communications system comprising a Digital Subscriber Line (DSL) system operative to transmit and receive the at least one of voice and data as high frequency data over the common line.

6. The system of claim 5, further comprising a splitter operatively coupled to the common line and to each of the DSL system and the POTS system, the splitter operative to send and receive the high frequency data relative to the DSL system via the common line and to send and receive the low frequency data relative to the POTS system via the common line.

7. The system of claim 1, further comprising a bus from which the high frequency communications system receives at least one of voice and data signals for downstream transmission as the high frequency data over the common line, the high frequency communications system comprising at least one buffer in which received data is stored during the temporary stoppage of downstream high frequency data.

8. The system of claim 1, the high frequency communications system imposing the temporary stoppage of downstream high frequency data for a time period sufficient to allow the change in the ringing condition to occur.

9. The system of claim 8, the time period being a predetermined fixed duration.

10. The system of claim 8, the high frequency communications system having at least two operating modes, the high frequency communications system controlling the duration of the time period according to in which of the at least two operating modes the high frequency communications system is operating.

11. The system of claim 10, the at least two operating modes comprising a fastpath mode and an interleave mode.

12. The system of claim 1, the detector being implemented as computer executable instructions in a controller of associated carrier equipment that also includes the high frequency communications system, the controller being operative to control a plurality of Digital Subscriber Line systems, the high frequency communications system being one of the plurality of Digital Subscriber Line systems.

13. The system of claim 1, the detector being implemented as computer executable instructions in a Plain Old Telephone Service (POTS) system of associated carrier equipment that also includes the high frequency communications system, the detector of the POTS system being coupled to communicate the notification to the high frequency communications system.

14. The system of claim 13, the high frequency communications system and the POTS system being implemented in an integrated hardware module.

15. A method for mitigating interference between low freqency communication signals and high freqency communication signals transmitted concurrently over a common line, the method comprising:
    detecting that a change in condition of the low frequency communications signal is about to occur; and
    temporarily stopping transmission of data in the high frequency communication signal to allow at least some of the change in the condition of the low frequency communications signal to occur; and transmitting idle data in the high frequency communications signal during the temporary stoppage.

16. The method of claim 15, the change in the condition comprising a change in a ringing condition for the low frequency communications signal associated with the common line.

17. The method of claim 16, further comprising notifying a transmitter of the high frequency communications signal that a change in the ringing condition is about to occur.

18. The method of claim 17, further comprising delaying the change in the ringing condition for a duration based on the notification.

19. The method of claim 18, further comprising temporarily stopping downstream traffic of data for a time period based on the duration of the delay associated with the change in the ringing condition.

20. A method for mitigating interference between low frequency communication signals and high frequency communication signals transmitted concurrently over a common line, the method comprising:
    detecting that a change in condition of the low frequency communications signal is about to occur; and
    delaying the change in the condition of the low frequency communications signal to allow completion of transmission of a current high frequency data frame.

21. The method of claim 20, wherein the change in the condition comprising a change in a ringing condition for the low frequency communications signal associated with the common line.

22. The method of claim 20, further comprising notifying a transmitter of the high frequency communications signal that a change in the ringing condition is about to occur.

23. The method of claim 20, further comprising
    temporarily stopping transmission of high frequency communication data signals after the completion of transmission of the current high frequency data frame for a time period sufficient to allow at least some of the change in the condition of the low frequency communications signal to occur; and
    transmitting idle data in the high frequency communications signal during the temporary stoppage.

* * * * *